United States Patent [19]

DeBaun

[11] Patent Number: 4,559,835
[45] Date of Patent: Dec. 24, 1985

[54] FLOW MEASURING TRAVERSE PROBE

[75] Inventor: Kenneth W. DeBaun, Santa Rosa, Calif.

[73] Assignee: Air Monitor Corporation, Santa Rosa, Calif.

[21] Appl. No.: 580,347

[22] Filed: Feb. 15, 1984

Related U.S. Application Data

[63] Continuation-in-part of Ser. No. 522,338, Aug. 11, 1983, abandoned.

[51] Int. Cl.$^4$ .................................................. G01F 1/46
[52] U.S. Cl. .................................................. 73/861.66
[58] Field of Search ........................ 73/861.65, 861.66

[56] References Cited

U.S. PATENT DOCUMENTS

| | | | |
|---|---|---|---|
| 1,119,581 | 12/1914 | Dodge | 73/861.66 |
| 1,250,238 | 12/1917 | Spitzglass | 73/861.66 |
| 2,352,607 | 7/1944 | Alperin | 73/861.65 |
| 3,415,120 | 12/1968 | DeLeo et al. | 73/861.65 |
| 3,751,982 | 8/1973 | Lambert | 73/861.66 |
| 3,803,921 | 4/1974 | Dieterich | 73/861.66 |
| 4,388,691 | 6/1983 | Nuspl | 73/861.02 |
| 4,425,807 | 1/1984 | Victor | 73/861.66 |
| 4,444,060 | 4/1984 | Yamamoto | 73/861.66 |
| 4,453,419 | 6/1984 | Engelke | 73/861.66 |

OTHER PUBLICATIONS

"Steam/Its Generation and Use", published by Babcock & Wilcox, 1975, pp. 33-28.

*Primary Examiner*—Herbert Goldstein
*Attorney, Agent, or Firm*—James F. Mitchell

[57] ABSTRACT

A traverse probe for insertion transversely with respect to the direction of bulk flow of an air or gas stream to sense and average a traverse of the static pressure and separately to sense and average a traverse of the combination of static and velocity pressure or total pressure of the stream. The probe includes along its length a spaced set of total pressure ports in the tube wall substantially aligned with the direction of flow in the zone of positive total pressure at the tube wall facing the direction of flow and first and second spaced sets of static pressure ports in the tube wall, one set aligned in each of the zones of static pressure only that lie at the tube wall adjacent to and on each side of the zone of positive total pressure. The set of total pressure ports is aligned on the bisector of the included angle between the sets of static pressure ports where the included angle is in the range of about 78°-80° for useful probe diameters.

9 Claims, 10 Drawing Figures

FLOW MEASURING TRAVERSE PROBE

This application is a continuation-in-part of application Ser. No. 522,338 filed Aug. 11, 1983, now abandoned.

This invention relates generally to devices for measuring the static pressure and total pressure of a flowing air or gas stream and using those pressures in a differential pressure means for indicating or controlling stream flow. It more particularly relates to a multiple sensor probe for developing separately the average static and total pressures in a traverse with which to indicate, measure or control bulk flow of the stream.

BACKGROUND OF THE INVENTION

Heretofore various airflow measuring devices have been employed to measure the bulk flow of air or gas streams particularly in conduits, such as single point sensing Pitot-static tubes, velometers and thermal hot wire anemometer probes or multi-point sensing devices like the airflow measuring stations illustrated in U.S. Pat. No. 3,685,355 and No. 3,733,900 issued to Kenneth W. DeBaun, U.S. Pat. No. 3,981,193 and No. 4,036,054 to Roger T. Goulet and U.S. Pat. No. 4,297,900 issued to Robert O. Brandt.

The present invention is an adaptation of the so-called Fechheimer probe described in "Measurement of Static Pressure," *Transactions of the ASME* (1926), Volume 48, pages 965–977 by C. J. Fechheimer; in "Quantitation of Stack Gas Flow" by C. L. Burton published in the *Journal of the Air Pollution Control Association,* August 1972, Volume 22, No. 8, pages 631–635; and in the article by Ralph Poole entitled "Aerodynamics for the Heating and Ventilating Engineer" appearing in *The Heating and Ventilating Engineer and Journal of Air Conditioning* for May 1946 at pages 455–460; and in textbooks such as *Fundamentals of Temperature Pressure and Flow Measurements,* Second Edition, edited by Robert P. Benedict, John Wiley & Sons, page 352. All the latter describe and utilize for one purpose or another the pressure distribution on the surface of a cylinder that is oriented substantially normal to the flow of an air or gas stream.

SUMMARY OF THE INVENTION

This invention comprises a cylindrical tube disposed transversely with respect to the flowing air or gas stream. The inserted tube develops a pressure distribution on the exterior tube surface with respect to the direction of flow like that illustrated, for example, at page 352 of the foregoing *Fundamentals of Temperature Pressure and Flow Measurements* including a zone of positive total pressure on the surface facing the direction of flow and separate zones of static pressure only adjacent to and on each side of that zone of positive total pressure. A negative pressure develops over the balance of the tube surface.

A spaced set of total pressure ports in the tube wall substantially aligned with the direction of flow and in the zone of positive total pressure is manifolded and the sensed total pressures in the traverse are averaged in one conduit formed within the cylindrical tube. Spaced sets of static pressure ports in the tube wall in each of the zones of static pressure only are manifolded and the sensed static pressures in those traverses, too, are averaged in a second conduit formed within the cylindrical tube of the probe. The total and static pressure sensing ports extend along substantially the full length of the tube with the total pressure ports aligned on the bisector of a critical included angle between the sets of static pressure ports.

A principal object of the invention is to provide a simple traverse probe that can be easily installed in or removed from existing duct work or stacks for measuring air or gas flow particularly where the stream is at high temperature or is laden with particulate matter so as to require frequent maintenance or cleaning.

Another object of the invention is a traverse probe which can tolerate substantial pitches and yaws with respect to the direction of airflow and, nonetheless, accurately sense and average the static and total pressures necessary for determination of bulk velocity or flow volume.

Still another object of the invention is to provide a traverse probe which does not require upstream air straightening devices of the type illustrated in U.S. Pat. No. 3,981,193 or No. 4,036,054.

Other objects and advantages of the invention will become apparent to those familiar with the art upon consideration of the following description of a preferred embodiment and the accompanying drawings.

DETAILED DESCRIPTION OF THE INVENTION

Figure 1:
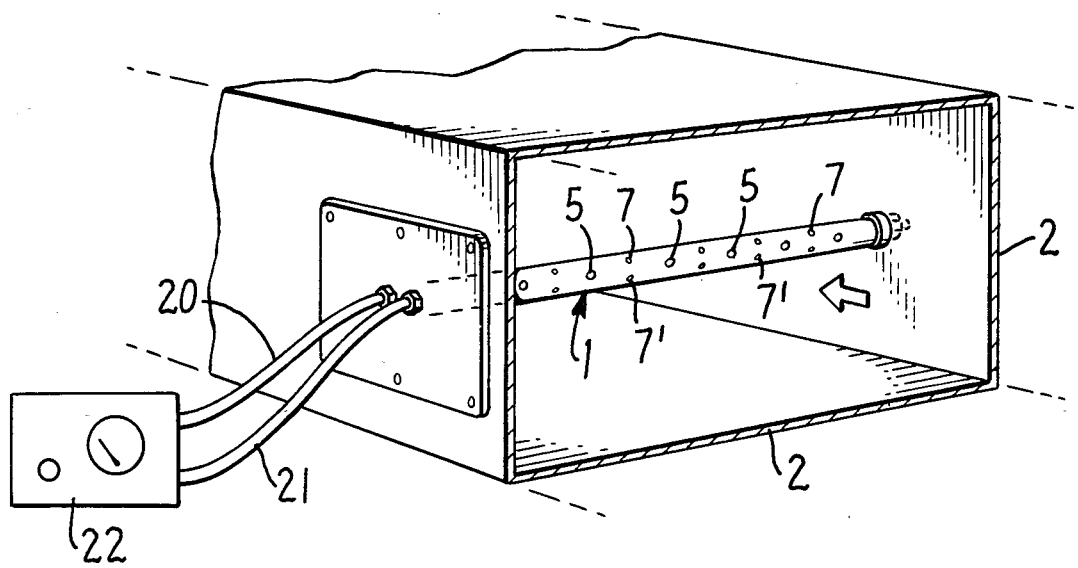
FIG. 1 illustrates a traverse probe in place in a rectangular duct connected to differential pressure means for measurement of flow velocity or volume.
Figure 2:
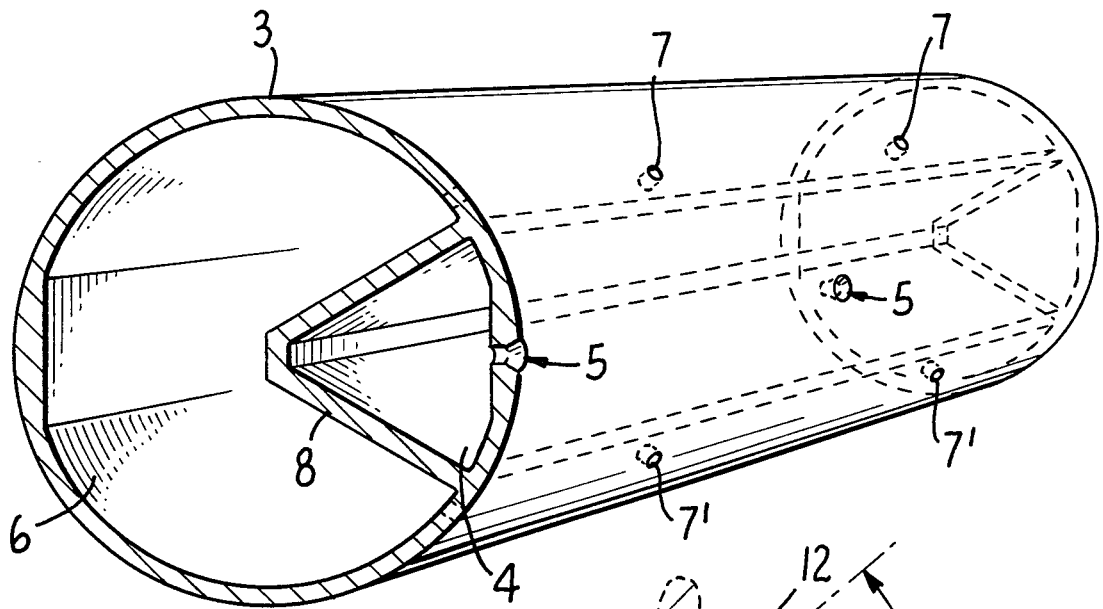
FIG. 2 is a partial cross-sectional view in perspective of part of the circular probe tube.

By reference to FIG. 1, the traverse probe 1 of this invention is illustrated mounted in a duct of rectangular cross section having walls 2 with air, for example, flowing in the direction of the arrow. The probe is deployed transversely with respect to the direction of flow, traverses the duct and, in the embodiment of FIG. 1, mounts at each of its ends upon the walls of the duct. As further illustrated in FIG. 2, the probe comprises a circular tube wall 3 having formed within it one conduit 4 for manifolding and averaging the total pressure sensed by the set of total pressure ports 5 bored in the tube wall and a second conduit 6 for manifolding and averaging the static pressure sensed by the sets of static pressure ports 7,7' also formed in the tube wall. Interior wall 8 with the tube wall 3 forms conduits 4,6 and separates one from the other.

Figure 3:
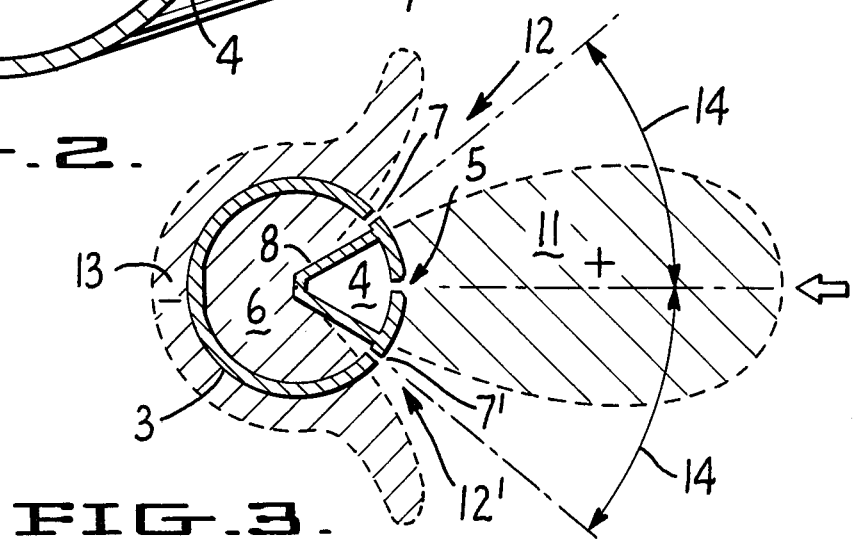
FIG. 3 illustrates the pressure distribution on the exterior tube surface with respect to the direction of flow when aligned with the set of total pressure ports.

The spaced set of total pressure ports 5 formed in the tube wall 3 aligns substantially with the direction of flow indicated by the arrow in FIGS. 1 and 3. As is more particularly illustrated in FIG. 3, the total pressure ports 5 that align with the direction of flow lie in the zone of positive total pressure developed by the flowing stream on the exterior surface of tube wall 3 facing the direction of flow. The zone of positive pressure is indicated generally as 11. Zones of static pressure only 12,12' are formed by the flowing stream adjacent to the zone of positive total pressure 11 and on each side of it. A zone of negative pressure 13 develops along the remaining, generally downstream surface of the tube. This pressure distribution is illustrated in various prior art such as the foregoing *Fundamentals of Temperature Pressure and Flow Measurements,* page 352. The distance of the dashed peripheral outline of zones 11 and 13 from the center of the polar plot of FIG. 3 indicates the magnitude of the velocity pressure compared to static pressure only at the origin. Zone 11 is positive and zone 13 is a negative pressure.

The spaced set of static pressure ports 7 is drilled perpendicular to the exterior surface of the tube wall 3 angularly spaced by a critical angle 14 from the set of total pressure ports 5 so that they lie in the one zone of static pressure only indicated at 12. Another spaced set of static pressure ports 7' is formed in the tube wall 3 equally angularly spaced by critical angle 14 from the set of total pressure ports 5 so that it lies in the other zone of static pressure only indicated at 12' in FIG. 3. The set of total pressure ports 5 align on the bisector of the included angle between the sets of static pressure ports 7,7'. That included angle is two times the critical angle 14. The static pressure only zones 12,12' are positioned at a critical angle 14 in the range of 39°–40° for probe tube diameters ranging from three-quarter inch to one and three-eighths inch or an included angle of 78° to 80°.

The set of total pressure ports 5 manifold with one via conduit 4 which averages the total pressure that they sense in a traverse across the duct. Conduit 6 manifolds all of the static pressure ports 7,7' and averages the static pressure that they sense in similar traverses across the duct. The averaged static pressure through external conduit 20, for example in FIG. 1, and the average total pressure through conduit 21 connect to differential pressure means 22 such as a monometer to indicate the differential pressure in terms of pressure, velocity or volume calibrations. Alternatively, the differential pressure means 22 may be a transmitter or other device which employs the differential pressure for control of the air or gas volume flowing in the duct, all as is described in the foregoing U.S. patents.

Figure 4:
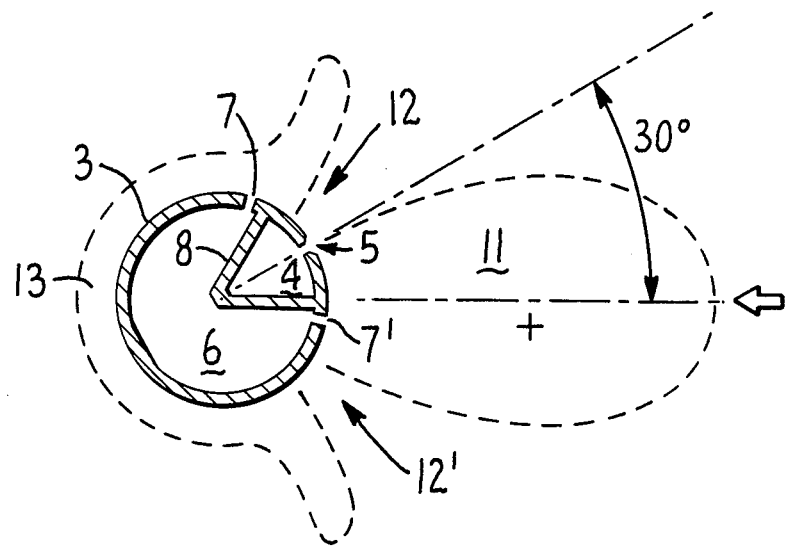
FIG. 4 illustrates the pressure distribution on the exterior tube surface with a 30° yaw.

FIG. 4 illustrates the flow pattern and pressure distribution of FIG. 3 yawed 30° from direct alignment with the set of total pressure sensors 5. Within yaw or pitch angles up to about 30° the probe measures flow velocity and volume with accuracy. Beyond about 30° major distortions start to occur with inaccuracy in excess of 10%. Flow measurement accuracy for small yaw angles may be achieved even with the probe pitched in the order of 30° with respect to an exactly normal orientation to the stream and the same is true for small pitch angles and the probe yawed in the order of 30°.

As can be seen in FIG. 4 for a 30° yaw, the pressures sensed by the static pressure ports 7,7' offset one another if they reside outside the zone of static pressure only. For example, in FIG. 4 the set of static pressure ports 7' resides in the positive total pressure zone 11 for the illustrated yaw. The variation from static pressure only is offset by a comparable negative pressure sensed by the set of static pressure ports 7 residing in the negative pressure zone 13. The very rapid and similar increase in velocity induced pressures on either side of the static pressure zones only 12,12' assures accurate flow measurement within about this 30° yaw range despite the lack of perfect alignment of the static pressure ports 7,7' with the static pressure zones 12,12'.

Figure 5:
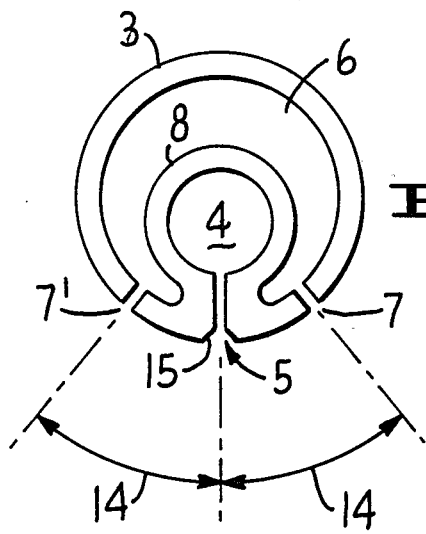
FIG. 5 is a cross-section of the extruded circular tube for a three-quarter inch diameter probe.
Figure 6:
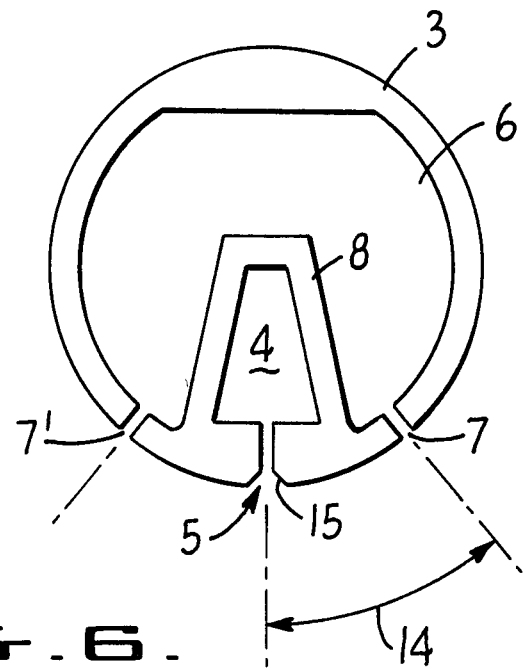
FIG. 6 is a cross-section of the extruded circular tube for a one and three-eighths inch diameter probe.

FIGS. 5 and 6 illustrate extruded tube cross-sections useful for the probe. FIG. 5 is a three-quarter inch outside diameter extruded tube 3 with its several elements designated as in FIGS. 2, 3 and 4. FIG. 6 illustrates a larger one and three-eighths inch diameter probe with its elements similarly designated. For the tubes illustrated in FIGS. 2–6, the static pressure ports are of uniform diameter in the range of 0.02–0.07 inches in diameter. They have sharp outer edges defined by the exterior surface of tube 3. On the other hand, accuracy of the probe is enhanced by chamfering the inlet ends of the total pressure ports that face into the stream flow. The diameter of the straight through portion of the total pressure ports is in the same range of 0.02–0.07 inches with the chamfered angle of about 45° to 60°. For rectangular ducts the sets of ports are equally placed along the full length of the probe tube so as to traverse equal duct areas with each port. For circular ducts they are spaced at equal concentric circular areas over the traverse.

In preferred embodiments, the total and static pressure ports are 3/64 inch in diameter for a probe having a tube wall ¾ inch in outside diameter and 1/16 inch in diameter for a probe having a tube wall 1⅜ inch in outside diameter. The tube walls 3 are about 0.065 inch thick for the ¾ inch probe.

Figure 9:
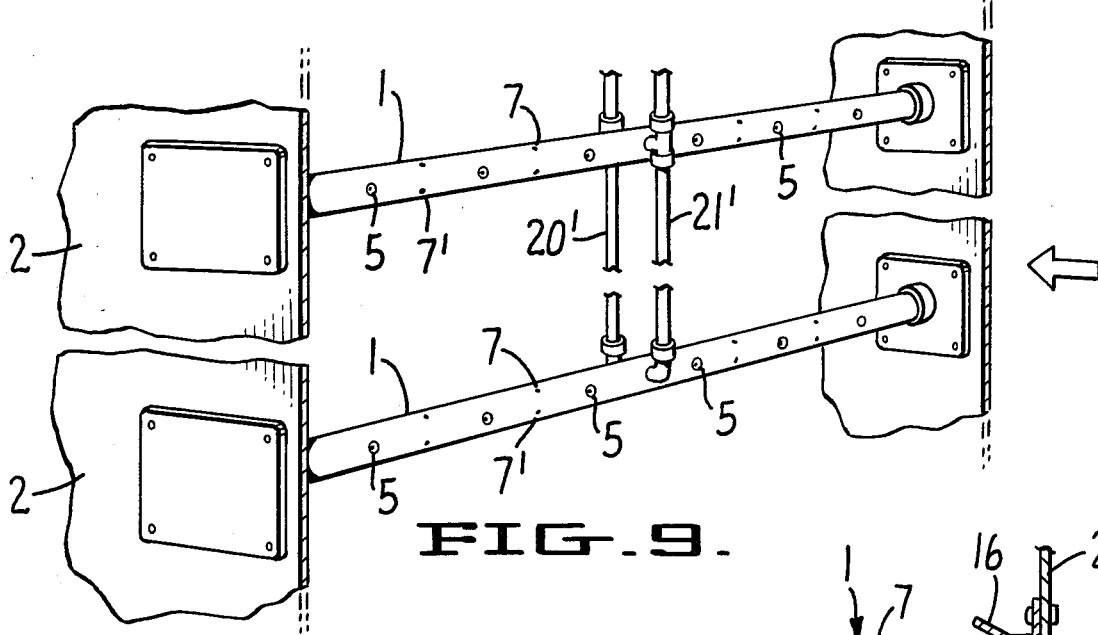
FIG. 9 illustrates a set of two or more probes distributed across a duct cross section with connections for the differential pressure means at the center of the sets of ports.

FIG. 9 illustrates a plurality of probes arranged to sense the pressures completely across the duct cross section. The several probes are manifolded together with static pressure conduit 20' and total pressure conduit 21', connected at about the geometric center of the port sets for symmetrical averaging as described in U.S. Pat. No. 3,685,355.

Figure 10:
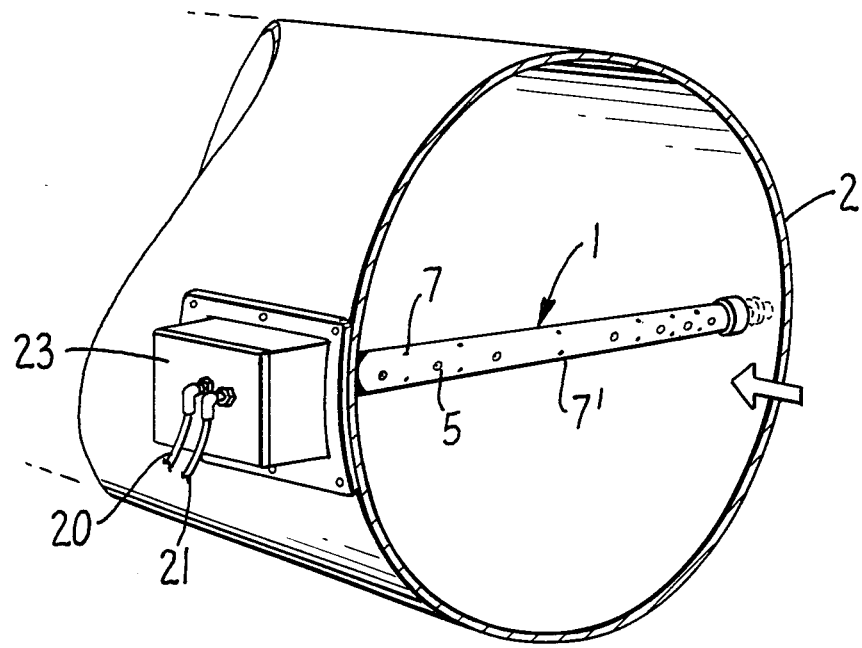
FIG. 10 illustrates the probe with extended access chamber mounted in a circular duct.

FIG. 10 illustrates the probe of this invention mounted in a circular duct and the same characters indicate its several parts. This probe has an extended access chamber 23 for insulated duct or stack service through which the static and total pressure conduits 20,21 connect to the internal conduits 6 and 4, respectively, within the probe tube wall 3. In this embodiment the pressure sensing ports 5,7,7' are spaced at the center of equal concentric areas as described above.

Figure 8:
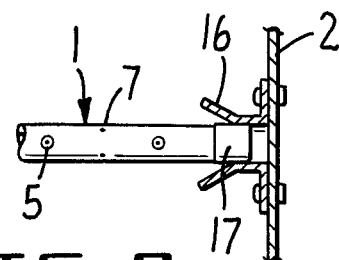
FIG. 8 illustrates one form of end mounting for the probe free end shown in FIGS. 1 and 10.
Figure 7:
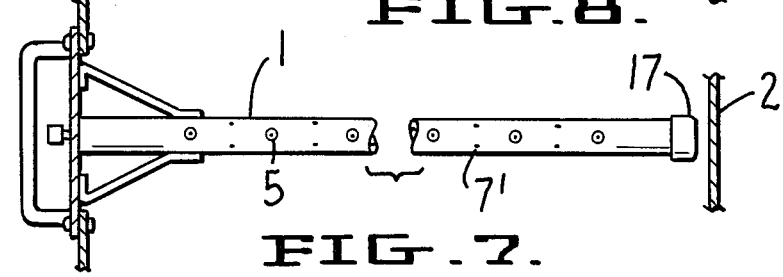
FIG. 7 illustrates a self-supported probe.

FIG. 8 illustrates a clip 16 for mounting the free end 17 of the probe from the duct wall 2 in the embodiments of FIGS. 1 and 10. FIG. 7 illustrates a self-supporting probe mounted at only one end from the duct wall 2 with no connection at its free end 17.

The embodiments shown in the accompanying drawings are for illustrative purposes only. Various modifications and variations in the described structure may be apparent to those familiar with the art within the scope of the invention defined in the following claims.

I claim:

1. A traverse probe for measuring the bulk flow of an air or gas stream comprising
   a cylindrical tube disposed transversely with respect to the direction of stream flow to develop a pressure distribution around the exterior tube surface which includes a zone of positive total pressure at the tube wall facing the direction of flow and separated zones at the tube wall of static pressure only adjacent to and on each side of the zone of positive total pressure;

a spaced set of total pressure ports in the tube wall aligned substantially with the direction of bulk flow in said zone of positive total pressure, said total pressure ports being chamfered at their inlet end facing into the stream flow with a chamfer angle *in the range of* 45°-60°;

a first spaced set of static pressure ports in the tube wall aligned in one of the zones of static pressure only;

a second spaced set of static pressure ports in the tube wall aligned in the other zone of static pressure only; and two separate conduits formed within the wall of the tube, one manifolding all of the total pressure ports in communication with one another and the other manifolding in communication with one another all of the static pressure ports.

2. The traverse probe of claim 1 wherein the first and second sets of static pressure ports are aligned an equal angular distance from the alignment of total pressure ports.

3. The traverse probe of claim 2 wherein the angular distance from the alignment of total pressure ports is in the range of 39 to 40 degrees.

4. The traverse probe of claim 1 wherein the sets of static and total pressure ports extend along substantially the full length of the cylindrical tube.

5. The traverse probe of claim 1 for circular ducts has the pressure ports spaced to be located in equal concentric areas.

6. The probe of claim 1 further including differential pressure means to indicate or control flow velocity.

7. The traverse probe of claim 6 wherein the averaged static and total pressures connect to the differential pressure means at about the geometric center of the sets of static and total pressure ports.

8. The traverse probe of claim 1 wherein the chamfer angle for the total pressure ports is 60°.

9. The traverse probe of claim 1 wherein the total and static pressure ports are in the range of 0.02 to 0.07 inches in diameter.

* * * * *